United States Patent [19]
Paul

[11] Patent Number: 5,524,081
[45] Date of Patent: Jun. 4, 1996

[54] GOLF INFORMATION AND COURSE MANGEMENT SYSTEM

[76] Inventor: Benjamin J. Paul, 48 Baldwin St., Charlestown, Mass. 02129

[21] Appl. No.: 236,139

[22] Filed: May 2, 1994

[51] Int. Cl.$^6$ .................................................. G01C 21/00
[52] U.S. Cl. ........................................ 364/460; 364/449
[58] Field of Search ............................ 364/424.01, 410, 364/460, 449; 379/88; 340/995; 273/32 R

[56] References Cited

U.S. PATENT DOCUMENTS

| | | | |
|---|---|---|---|
| 4,924,402 | 5/1990 | Ando et al. | 364/449 |
| 4,963,865 | 10/1990 | Ichikawa et al. | 340/995 |
| 5,086,390 | 2/1992 | Matthews | 364/410 |
| 5,089,826 | 2/1992 | Yano et al. | 364/410 |
| 5,127,044 | 6/1992 | Bonito et al. | 379/88 |
| 5,305,201 | 4/1994 | Matthews | 364/410 |
| 5,319,548 | 6/1994 | Germain | 364/410 |
| 5,364,093 | 11/1994 | Huston et al. | 273/32 R |

*Primary Examiner*—Kevin J. Teska
*Assistant Examiner*—Dan Fiul
*Attorney, Agent, or Firm*—Edwin H. Paul; Jerry Cohen; Stephen Y. Chow

[57] ABSTRACT

A golf information and management system utilizing the Global Positioning System, a satellite based, radio navigation system where clocks signals are transmitted. This satellite system provides at least four satellites (2) "in view" at all time. A golf cart (12) or player receives the signals from the four satellites, compares the clocked signals and an on-board computer reads the clocked signals and determines the position, in three dimension, of the receivers (velocity of the receivers is also available). There is a fixed base location (8) on the golf course that also receives the satellite signals and transmits a differential correction signal, via another channel, to the golf cart or player, where the computer determines the position of the cart or player to within a yard. The computer may be pre-loaded with golf course information, such as pin position, hazard positions, etc., where the computer via a graphical display (18) communicates to the player exact distances to the pre-loaded known physical features of the golf course, and displays information needed by the player to determine his next shot, including a video presentation of a golf pro's suggestions. In addition, the cart may communicate with the base station where the base station can track each cart or player on the course. With such information, detecting slow players to allow better course management, and also allows the base station to output information to a cart to show the players ahead so as not to hit into other groups and to send messages to carts to urge faster play to send out other type messages.

6 Claims, 7 Drawing Sheets

GOLF INFORMATION AND COURSE MANGEMENT SYSTEM

FIELD OF THE INVENTION

The present invention relates generally to the golf industry, golf courses, and more specifically to managing play on the golf course. In particular, the present invention is related to knowing where on the course the golfer is, where important features on the course are in relation to the golfer's location, and in general how to efficiently play the course.

BACKGROUND OF THE INVENTION

Golf is an increasingly popular game. Twenty-five million golfers in the US alone play on over fifteen thousand US courses. To grow the golf industry must attract and retain new players while successfully accommodating the play of existing golfers. However, trends indicate that only 1 in 3 people who try golf for the first time continue to play the game (i.e. the current retention rate of new players is 33%) partly due to the fact that speed of play has slowed steadily over the past decade. In the early 70's, an average 18 hole round required 4½ hours to complete. By the early 90's, the time had increased to 5½ hours. Golf courses and resorts would like to improve speed of play to improve their bottom line, since more paying players on a course means more income, and more new golfers would be retained.

Slow play and low retention rates for new golfers represent significant risks for the golfing industry. Speed of play directly affects the total number of rounds played, and so the course revenue, and has an indirect impact on food and beverage sales, and merchandise sales. Perhaps more importantly, slow play decreases overall enjoyment of the game.

Before the advent of golf carts, caddies were common in the golf industry. In addition to carrying a player's golf clubs, a caddie provided a golfer with a substantial amount of information and knowledge about a course. Today, the professional caddie provides information about course layout, green configuration, yardage to hazards, and other critical elements of a professional golfer's strategic game, including evaluation of the ball's position, or lie, and suggestions on optimal club and shot selection.

However, average golfers no longer play with caddies, but use golf carts which have also become a revenue source for the golf course owner. The absence of the caddie's knowledge has had a significant negative impact on a player's ability to formulate strategy based on the lie and the local layout, especially for a player who is an occasional or first time player of a course. This lack of knowledge inhibits players from developing the strategic skills which now must be nurtured through years of playing familiar courses. The information that caddies once provided, and still provide to touring pros, would still greatly enhance the game and play of amateur golfers.

Golf industry publications and the governing bodies associated with golf are launching programs to improve speed of play. One such program is to rate courses for their speed of play. Courses which do not achieve target speeds of play will be rated less favorably than those that do.

Looking more closely, studies have indicated that there is no clear single reason causing the slow play problem. Slow play is not caused by: female golfers; high handicaps (i.e. skill level), lost balls (and time spent searching for them), or length of time spent on greens putting. The studies also show that there is no apparent quick fix to the speed of play problem. Playing through (the courtesy of allowing a faster group to get in front of a slower group) has been shown to only slow play.

Course signage can provide yardage, course layout, and hole configuration information. It's effectiveness is limited by several factors. First, signage is limited to fixed locations, usually the hole layout is shown at the tee, and typically there is a marker at 150 yards from the center of the green. The golfer cannot look at the layout sign (or see a yard marker) when the golfer is in the fairway or rough - where they need it. Second, the use of fixed yard markers encourage golfers to pace off yardage from the nearest marker to their lie and so slow the play. In addition, yard markers are not usually provided within a range of 100 yards of the pin (yet would provide critical information for these so called touch shots). Fixed yardage markers do not reflect the regular changes (i.e. daily) in pin (hole) location.

Many of these problems cannot not be readily overcome. For example, fixed yardage markers cannot be installed inside the 100 yard range without encountering issues associated with geometry of hole placement, yardage calibration point, and the radial distribution of fixed yard markings.

Yardage books provide similar information to fixed course signage. High quality printing allows yardage books to provide more detail and extensive yardage measurements from various points on the course. However, the yardage books do not provide yardage to the actual pin location. The books are cumbersome and, since the information in the book is complex in the attempt to be complete, the relevant information is not selectively presented to the golfer. Finally, yardage books, similarly to fixed yardage marking, do not provide information within 100 yards of the green.

Score cards typically provide course layouts. The graphics are usually small, often inaccurate, and provide limited resolution, and limited use in actual play.

Various companies have marketed electronic yardage systems. Yardmark, Inc. is a typical example. Yardmark is the assignee of U.S. Pat. No. 5,044,634 - invented by Dudley, for a cart mounted electronic yardage measuring system. The system uses embedded radio frequency (RF) tags to 'mark' a course. The RF tags are detected by a cart mounted unit which then displays yardage to pin and yardage to hazards on an alphanumeric screen. The system has the following limitations: the screen is not dynamic, the system provides limited information beyond simple yardage differentials, and the entire information content is based on relative position and not actual location on the course. The golf course operator must commit to an extensive survey and installation of related markers and equipment before the system can be demonstrated.

Yardmark, Inc., markets another system under YARDMARK™ that determines differential yardage based on LORAN technology. Radio towers are erected at or in proximity of the course, and cart mounted units use the LORAN signals to triangulate and find their position. Alphanumeric displays indicate distance to the front and back of the green and to the pin.

RANGEMASTER™ is another LORAN based system which is being installed at golf courses. This system utilizes broadcasting towers and alphanumeric displays that are very similar to the YARDMARK™ system.

LORAN based systems are susceptible to electronic and radio frequency noise. For example, electric carts generate significant noise that will adversely affect operation of such LORAN systems. Another limitation of LORAN systems in the need to erect the local broadcast towers.

Vistatronics is marketing the Vistatronics Eagle™, a hand held laser range finding device which allows the golfer to determine yardage to pre-positioned pins (or the hole pin) equipped with plastic reflectors. The product has a limited range (±1 up to 200 yds., diminished accuracy up to 300 yds.). In addition, the range finder can only be used in line of site situations and therefore cannot provide yardage on doglegs (holes which angle significantly to the left or right), elevations, or blind shots. While the device is hand held, allowing distance to be determined (within accuracy limitations) at the exact location of the ball (assuming line of sight to a marker), its use can be cumbersome when combined with all of the activities of a golfer preparing for a shot. Finally, the system requires that the golf course operator survey and install markers on the course.

In another approach to the slow play problem, Linkstime hole timers were developed. The timers use a digital display to indicate 'par time' for each hole. Golfers are encouraged to speed play in order to insure that the indicated elapsed time of play (on each hole) never exceeds the 'par time'. The system is limited by several factors. When 'par time' is exceeded, the golfer is alerted by an intrusive beeper. The system alerts the golfer once they are already guilty of slow play. The 'alarm clock' nature of the product is hardly in keeping with the traditionalism and serenity of the golf environment.

Timers have the distinct limitation that they measure speed at the end of each hole, but the timers do not help identify the elements of slow play.

OBJECTS OF THE INVENTION

It is an object of the present invention to provide: golf cart (and so the golfer and the golfer's ball) location to within ±1 yard anywhere on the course, the golfer's position relative to course landmarks, information such as distance to the pin, in-play hazards, etc., and to provide an accurate graphical display of the cart's position on a golf hole.

It is another object of the present invention to require no modification of the golf course.

Yet another object of the present invention is to provide actual fairway yardage estimates to the pin and to relevant course features. Yardage estimates will reflect the realities of course layout and not simply reflect a point to point distance calculation. For example, on a dogleg hole the distance to the pin will reflect play down the fairway and not the distance from tee to pin.

It is yet another object of the present invention to provide relevant distances on 'blind shots' where the golfer does not have a clear line of site to their intended landing area.

It is yet another object of the present invention to provide selective information where and when it is needed. This information via a graphical display includes all the relevant information needed by a golfer to evaluate and plan the next shot, that is the club, the direction, where the trouble lies, how far of a carry is needed, is the group ahead clear. etc.

It is an object of the present invention to provide the location of all carts on the course to a base station, so slow play can be identified and messages sent to each cart to urge speedier play. In addition, the base station can indicate the location of golf groups ahead of each group to prevent hitting into the group ahead. Another object is to provide a display of the course layout and all cart locations to a course ranger's mobile unit so that the ranger may physically intervene where problems may occur.

Another object of the present invention is to provide a display the positions of other golfers nearby so that players may hit their ball without impacting those other golfers.

Still another object of the present invention is to provide suggestions on play from the golf pro, these suggestions by text on the display screen or in the form of a video of the pro.

It is another object of the present invention to provide a profile of an ideal round where time and position of a given cart are measured against the profile of an ideal round and the golfer is given a continuous evaluation of their pace of play: at the tee, on the fairway, chipping out of a bunker, putting off a green, or picking up refreshments at the turnaround (typically the time between the 9th and 10th holes).

And yet another object of the present invention is to provide a system that is less susceptible to noise.

SUMMARY OF THE INVENTION

The preceding objects are met in a golf information and management apparatus including a first receiver constructed and arranged to accept satellite signals from at least three sources, and to convert said satellite signals into first computer readable signals, a second receiver constructed and arranged to accept a correction signal, and to convert said correction signal into second computer readable signals, computer means that accepts the first and second computer readable signals, said computer means pre-loaded with information relevant to playing golf course, means to send the first and second computer readable signal to said computer means, where the computer means determines relative locations on the golf course, and display means to report the relative locations to the golfer. Use of three satellites allows the position of the cart to be determined and use of four or more satellites allows the vertical position of the cart to be determined.

In a preferred embodiment there is an additional communication means for sending the location of the cart or player to the base station. With such communication means the base station can communicate information on position of player group ahead to prevent hitting into the group ahead or send speed-up or other messages to any cart.

The pre-loaded relevant information includes the location of features on the course - the pin on the green, all the hazards and out-of-bounds in play, the relative vertical heights, the distance to the doglegs, wherein the computer via the display communicates the distance of the cart to all the features in play such that the player can evaluate and plan the next shot. However, in some preferred embodiments and in certain situations relative vertical height can be calculated accurately without pre-loaded information.

The invention provides useful information to golfers on the course, while they are playing. The information includes location, course layout, green configuration, pin location, pro's notes or pro video (suggestions from the golf pro), a speed-of-play indicator, and other elements useful to golfers (e.g. relative elevation of the pin, wind conditions, other cart locations). The invention provides course management with a display of cart locations throughout the course, speed-of-play indications for each of those carts, and communications with the golfers (through cart mounted units). The system provides the very information that is used by today's professional player's to evaluate a given lie and plan their next shot.

Information is displayed in a graphical format, allowing the golfer to quickly assimilate the critical information. The golfer's location is indicated by an icon overlaid on a course schematic. Distance to the pin and relevant course hazards are apparent from the graphical display, but in addition, are calculated and displayed numerically for ease of use.

In a preferred embodiment the satellite system is the Navigational Satellite Timing and Ranging or NAVSTAR where the satellite signal include clocking information, and where the computer means includes an internal clock, and where the computer means compares the received clock information and compares the received clock information to the internal clock to determine the position of the cart.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
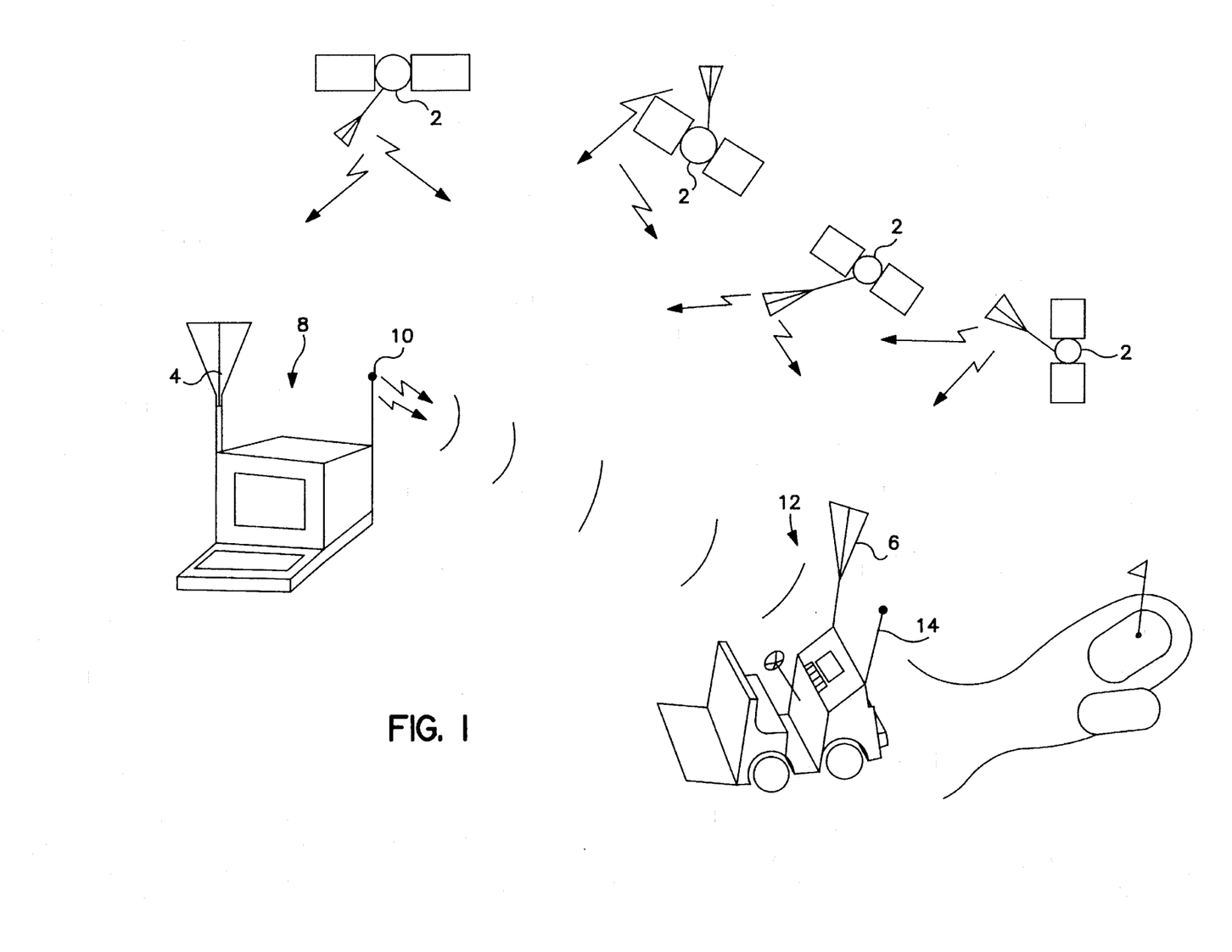
FIG. 1 is a block diagram/schematic of a preferred embodiment of the invention.

FIG. 1 shows the functional elements of a preferred embodiment of the present invention. Four satellites 2 which broadcast radio frequency (RF) signals to the earth. These RF signals are received by the antenna 4 at a fixed, known base station that is constructed into the club house or pro-shop of a golf course. The RF signal are also received by antenna 6 on a golf cart, a mobile unit that carries golfers on their play around the golf course. This system provides the elements to locate the cart anywhere on the golf course. A preferred embodiment allows useful position information to be calculated by receiving only three satellite signals.

The basic position locating system is a NAVSTAR Global Positioning System (GPS) augmented with local differential correction in order to achieve the required accuracy. The mobile GPS receivers 6 are used to track navigation signals from the constellation of GPS satellites 2.

Differential correction is achieved through the base (master) receiver and computer system 8 pre-positioned at the course. The master receiver tracks the GPS signals, converts and processes the signals and broadcasts pseudo range corrections via an antenna 10 to the mobile positioning units (carts) 12 on the golf course. An RF antenna/receiver 14 on the cart (separate from the GPS receiver) picks up the differential corrections broadcast from the master or base station. A preferred embodiment uses pseudorange correction based differential techniques to achieve the ± one yard position accuracy. Other preferred embodiments use carrier phase differential or position differential techniques.

Figure 2:
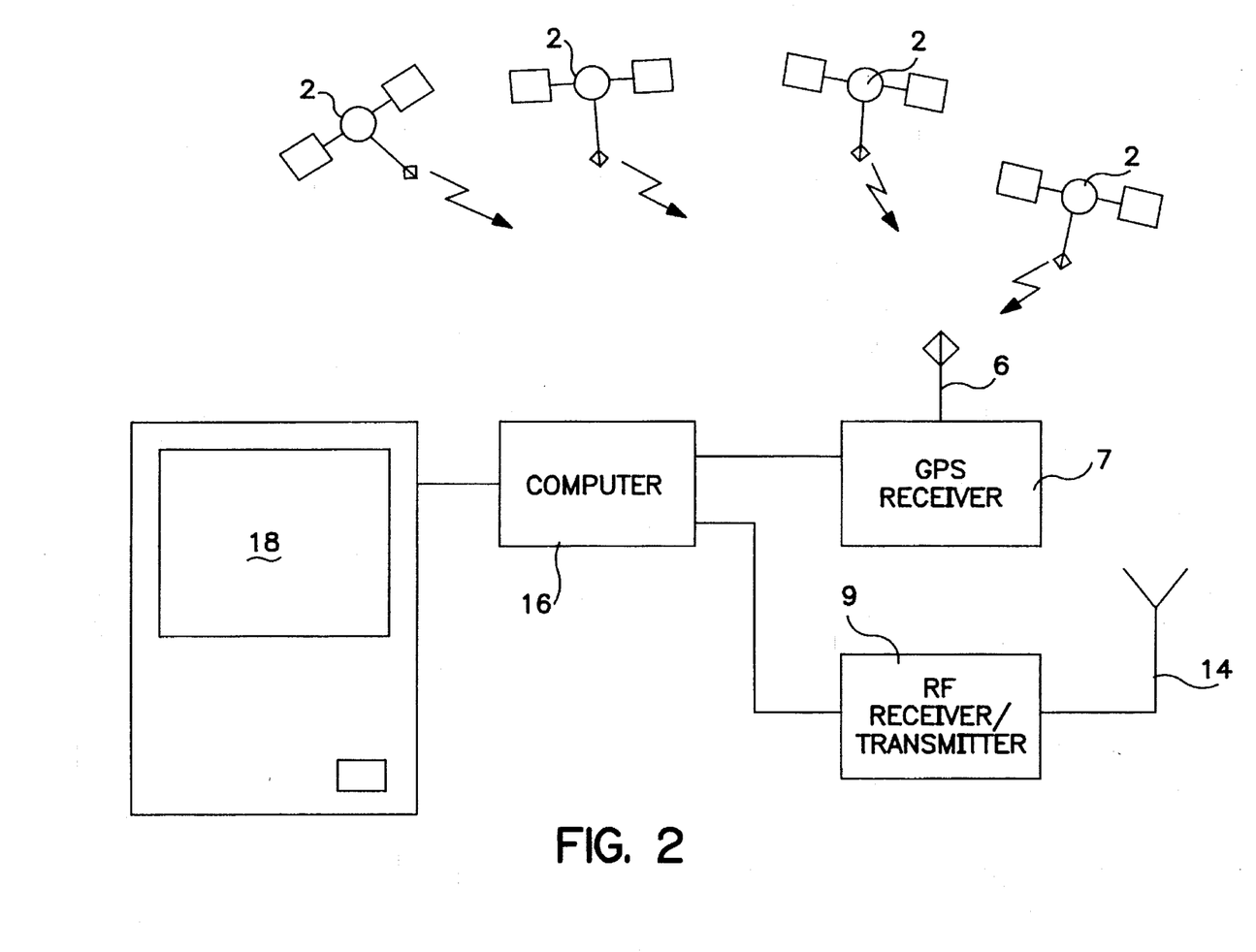
FIG. 2 is a block diagram/schematic of the cart/mobile unit.

FIG. 2 shows the block diagram/schematic of the cart 12 unit. Antenna 6 receives the GPS signals from the satellites 2 and processes and translates these signals into computer compatible signals that are fed to the computer 16. The RF antenna 14 receives the correction signal from the base unit and converts this signal to a computer compatible signal for the computer. The computer 16 receives, processes and translates the processed satellite and correction signal to provide an absolute Differential Global Positioning System (DGPS) position, expressed, in this preferred embodiment in milliseconds (ms) of latitude and longitude and centimeters of height relative to a standard ellipsoid. The computer then outputs to the graphical display 18 the position on a display of the hole being played.

Figure 3:
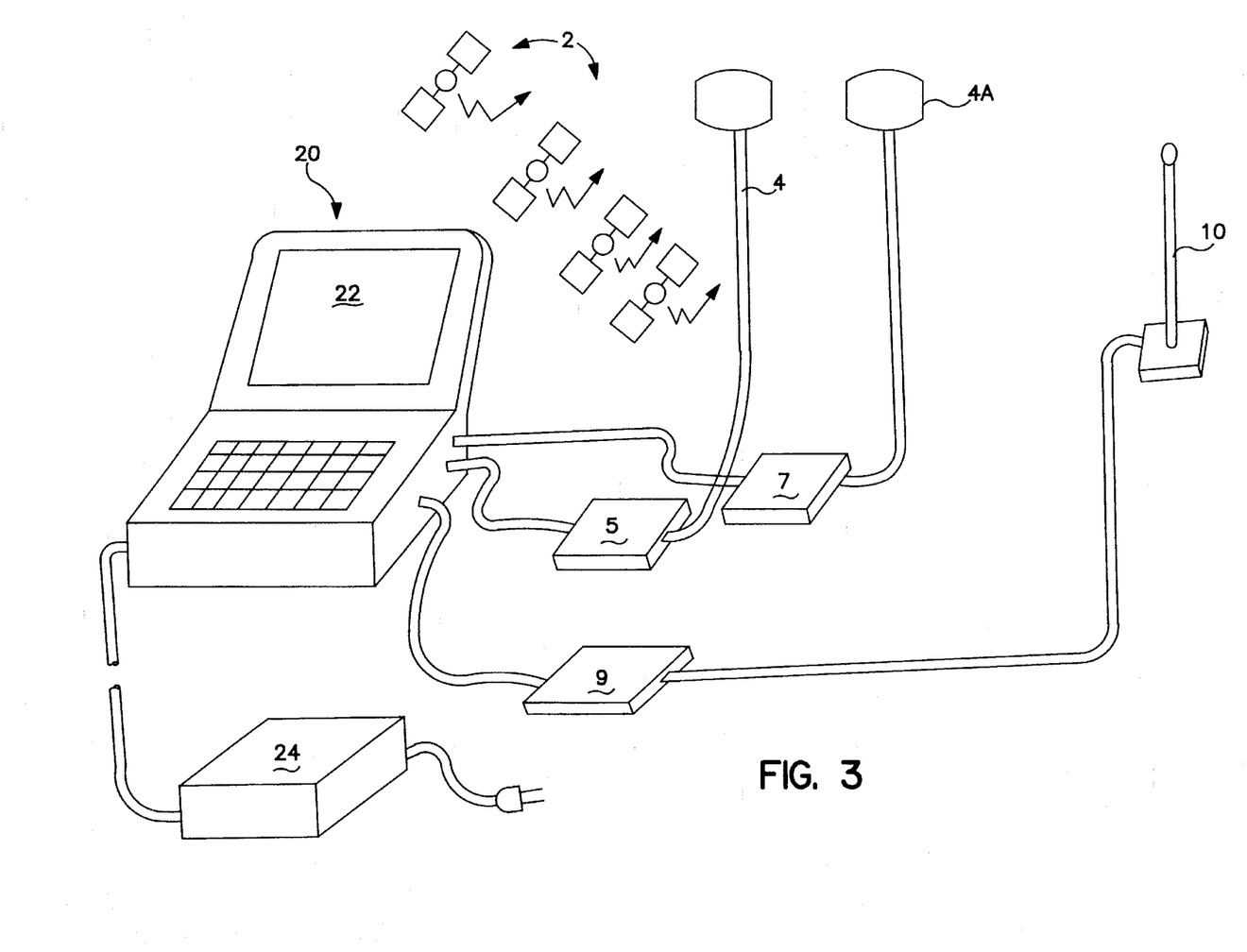
FIG. 3 is a block diagram/schematic of the base unit.

FIG. 3 shows the block diagram of the base station. This embodiment utilizes two GPS antennas 4 and 4A for redundancies. The received satellite signals are fed to the computer 20. The base unit has a predetermined known location and sends out correction signals to the carts or other mobile units via the RF antenna 10. An un-interruptible power supply is used to ensure reliable operation under aberrant power occurrences.

The GPS and DGPS (Differential GPS) system is well known in the art and is explained in a paper entitled, GPS TECHNOLOGY AND OPPORTUNITIES, by Clyde Harris and Roy Sikorski. This paper was written for presentation at EXP COMM CHINA 1992, and said paper is incorporated by reference, as if laid out in full, herein. However, a brief explanation of the principles follows. The satellites broadcast a clock's signal, so that the mobile unit that want to calculate its position, receives four clocked signals from four satellites. The satellite clocks are kept synchronized to standard GPS time. The receiver has a clock that is unsynchronized to the GPS time, but can measure the offsets from the four GPS satellites. The receiver will process these timed signals together with the computer's internal clock. Knowing that the receiver has an fixed time offset compared to the four satellite clock signals, and that there is another difference between the mobile clock and each of the satellite clocks since each satellite is at a different distance from the mobile unit, the computer can compute the three dimensional position (longitude, latitude, altitude) of the mobile unit. This calculation entails solving four simultaneous equations as is well known in the art. By applying a differential techniques the accuracy of the DGPS can be made to ± one yard which is suitable for golfing. This differential technique requires a base station with a known location. The base station receives the same four satellite signals as the mobile unit, from the satellite clocks as described above the base station determines its location. The base station then calculates corrections (offsets) for pseudoranges of visible satellites. The pseudorange corrections are calculated by the base station so that when added to the pseudoranges derived from the satellite signals, the corrected pseudoranges yield the known position of the base station. Such pseudorange correction factors are then sent to the mobile units. This error is then sent to the mobile units via another channel so that the mobile unit can apply the error correction to determine the mobile units location to within ± one yard. Useful information is obtained if only three satellites are used - here only two dimensional information can be obtained, e.g. the location (longitude/latitude), but not the altitude.

Figure 4:
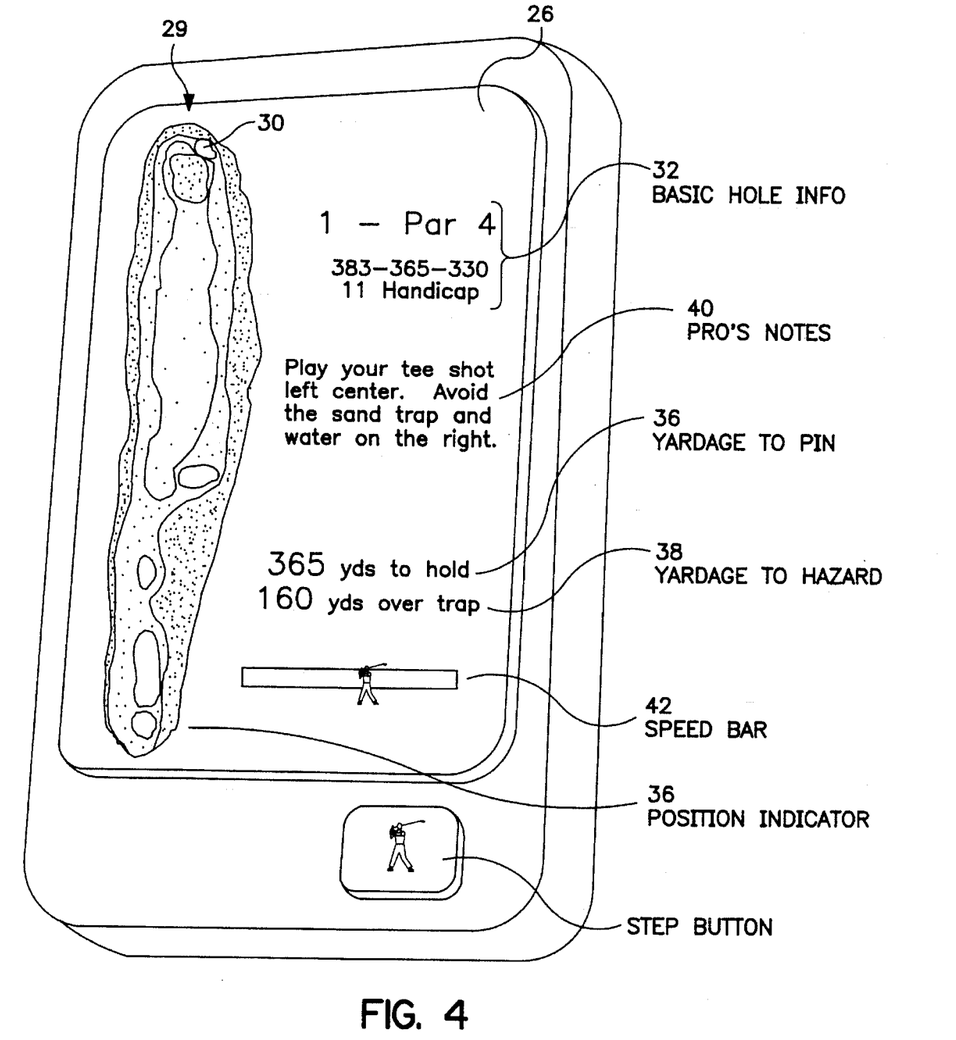
FIG. 4 is a detail view of the graphical display showing the cart at the tee.

FIG. 4 shows the graphic display 26 on the cart. The cart CPU is pre-loaded with a map 29 of each hole. The display has basic hole information 32 for the first hole, i.e., par 4, the distances to the green center from each tee "383" yards from the long tee 32, "365" yards form the middle tee, and 330 yards form the short tee, the handicap hole number, including all the hazards. The hazard 28 is highlighted as it is in play while the green-side bunker hazard is shown but not highlighted since it is not in play. The golfer's position 36 also is highlighted on the graphical hole layout. From the golfer's position the CPU further calculates actual fairway yardage distance to pin 36, the distance to hazards in play 38 and other critical information. Based on location, the unit retrieves stored pro's notes 40 that provide strategy based on the current lie and other elements of the golfers play. For example, the pro's notes can describe an aggressive shot, a safe shot, or a beginner's shot. In another preferred embodiment a video and audio can be displayed showing an individual giving advice or tips for playing each hole, such video provides a more friendly version of the golf pro's notes. In another preferred embodiment, the system shows the golfer's speed of play 42 and an evaluation of the golfer's round so far (as embodied in cart movements) to determine which type of advice is most applicable.

In another preferred embodiment the cart displays a "fly-by" of the hole. A simulated video is shown on the mobile unit display of the view of a helicopter flying along the fairway from the tee to the green.

The system can provide a continuous evaluation of a golfer's speed of play. The cart cpu can store a profile of an 'ideal' 18 hole round. The 'ideal' round represents the continuous elapsed time/position profile of the course pro (or other designated player) playing an 18 hole round. Such an 'ideal' round serves as a template for evaluating speed of play. The 'ideal' round embodies important factors like the overall time required to play a round, the subtleties of a good rhythm, and the nonlinear nature of time required to tee off, play the fairway, put off the green, or play a par 3 as over against a par 5. In another preferred embodiment, the base station can update the speed bar 42, or alternatively send information to the cart via the RF antenna 14 to indicate slow play compared to other on the course. In addition, (not shown) the base unit can show on the display other groups playing the same hole or nearby and so indicate when it is necessary to wait until the group ahead has moved on.

Figure 5:
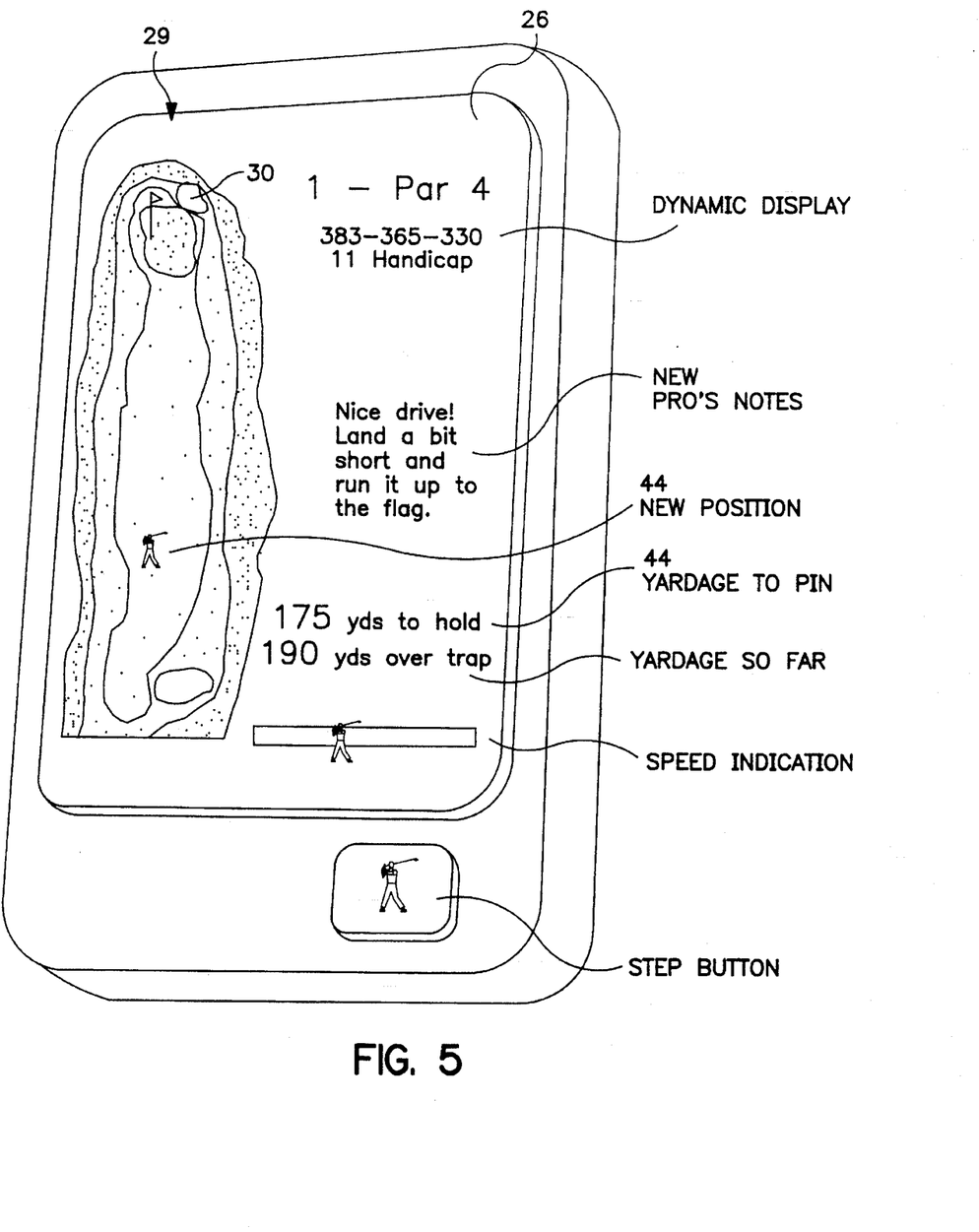
FIG. 5 is a detail view of the graphical display showing the cart on the fairway.

In yet another preferred embodiment the speed bar 42 provides an evaluation of each golfer's speed of play. As a golfer falls behind the 'ideal' position/time profile, the speed bar icon turns red and slides to the left. As the golfer picks up pace and moves ahead of the 'ideal' round profile, the golfer turns green and moves to the right of the Speed Bar. In a preferred embodiment, the graphical display can provide at least the following information:
location on the course and location of other nearby groups
course layout
pin location
green configuration
  pin location
  size
  slope
  elevation
  speed
  grain
distance-to-pin
fairway yardage
distance to significant hazards and position to hazard contours
pro's notes FIG. 5 shows the graphical display of the cart when in the fairway. Here the display shows only the relevant or in play part of the hole. The green side bunker 30 is highlighted and the cart's position id shown. The other items are as in FIG. 4.

Figure 6:
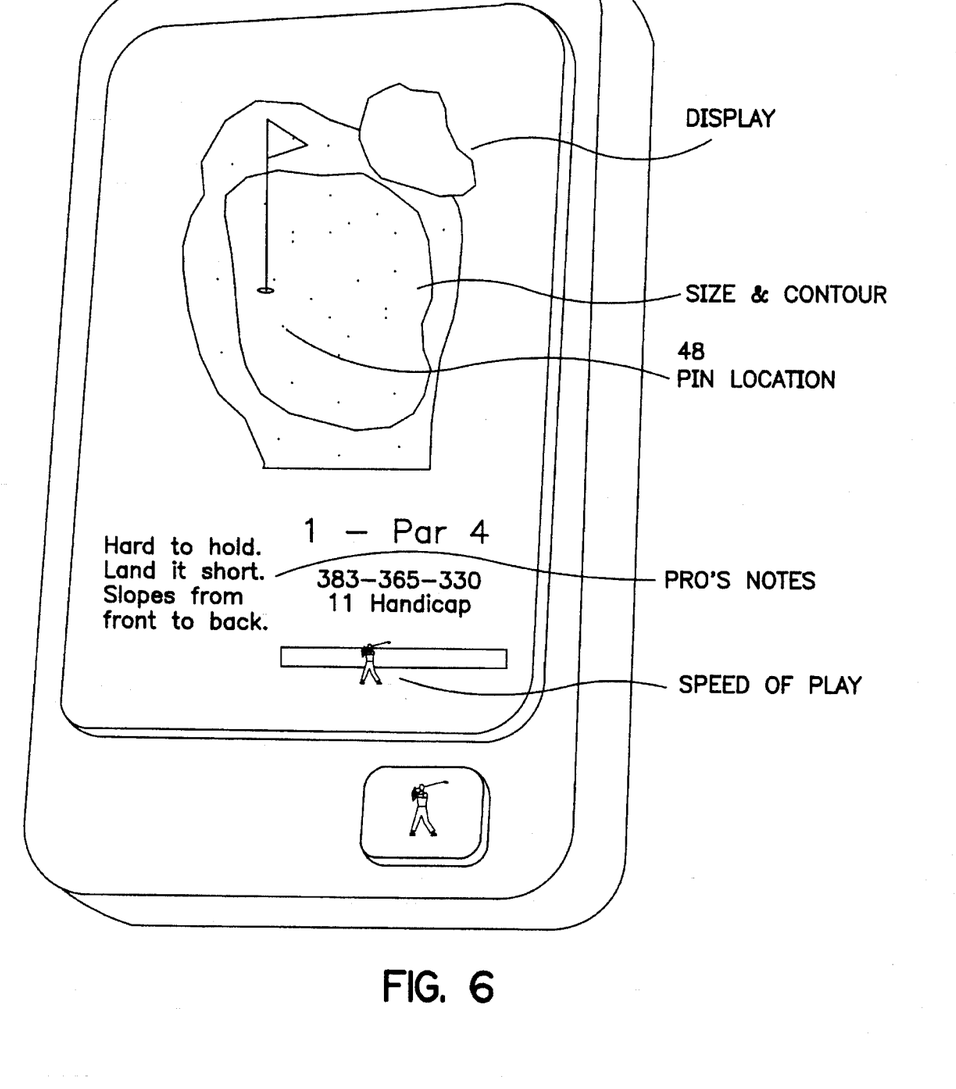
FIG. 6 is a detail view of the graphical display showing pin and green.

FIG. 6 shows the green in detail with detail of the pin location 46 and the relevant distance and notes for the green.

Figure 7:
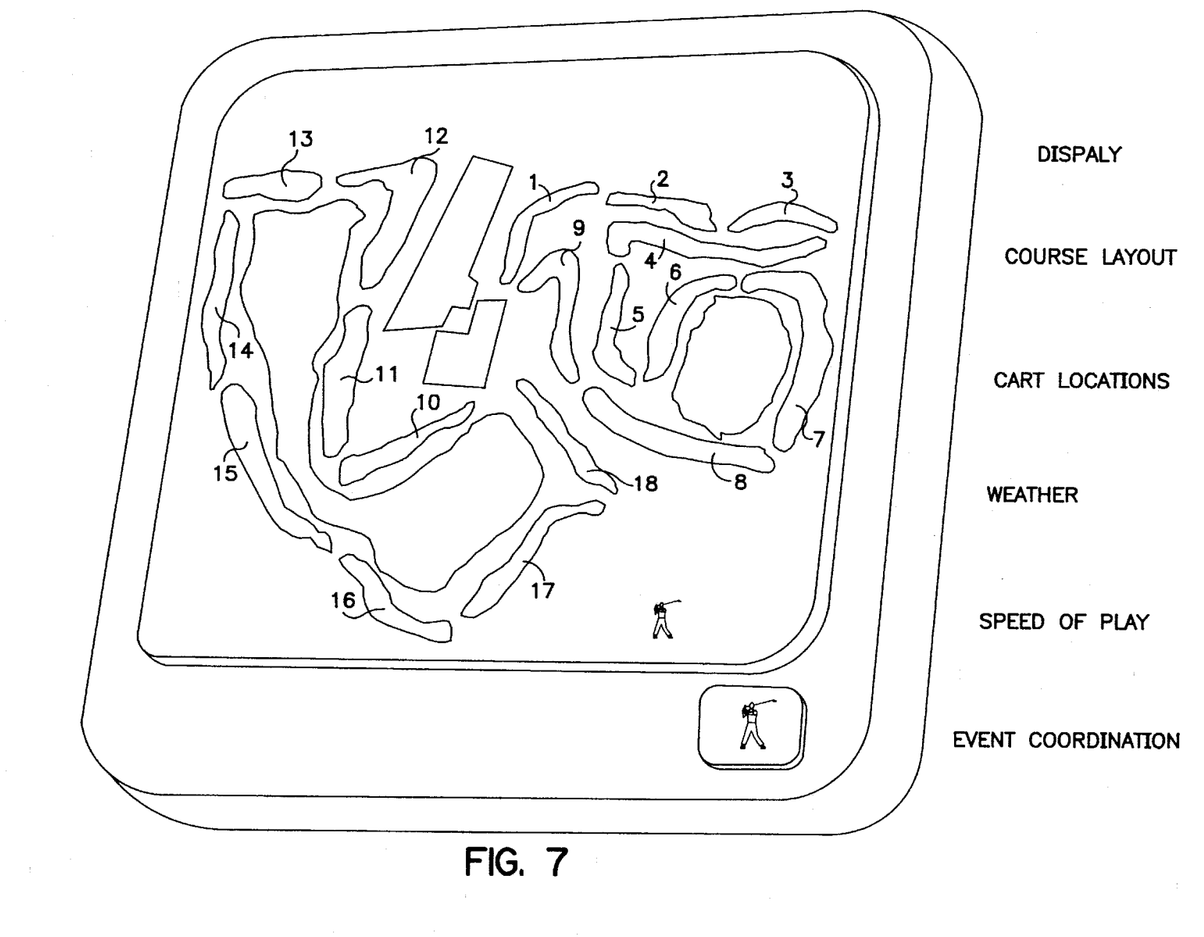
FIG. 7 is a detail view of the graphical display at the base station.

FIG. 7 shows the graphical display at the base station, or on a rangers mobile unit. Here the entire golf course or any particular part is shown. All the carts are highlighted to facilitate course management.

The base unit consists of a PC 20, two GPS receivers 5 and 7, two GPS antennae 4 and 4A, a radio transmitter/modem 9, and an RF antenna 10. The PC provides a display, CPU, data storage, and sufficient I/O capabilities. The two GPS receivers allow the base unit to track all of the satellites in view (in one embodiment the GPS receiver is limited to 5 channels, in another, 6 channels, etc.) and provide a level of redundancy if one of the units should fail (in this embodiment, the base unit is essential to the operation of the mobile receivers whereas if a mobile GPS unit fails, that single unit can be replaced).

The base unit performs other functions in addition to broadcasting the differential corrections. It provides a mechanism for broadcasting messages to all carts or any specific cart. The broadcasts can include notices from the clubhouse, weather alerts, advertising, leader board updates, etc.

In another preferred embodiment, the base unit can be used to coordinate corporate events and tournaments. Updated scores and information are broadcast to the golfers playing the course.

In another embodiment, the carts are equipped with an RF broadcast capability and broadcast their position to other carts and the base unit. In this embodiment, the base unit displays the entire course with an overlay of every cart, it's position, and an indication of the cart's speed of play. The system provides an immediate evaluation of course through-put and any speed of play problems as they arise. The same information, in another embodiment, can be communicated to a mobile display mounted on a ranger's cart.

The ranger unit would display all cart locations and their speed of play. This unit would allow rangers to more effectively manage players on the course. The unit at least would identify slow play before it causes a backup and reduces course through-put.

The cart mounted units with broadcast capability will allow additional features. For example, the golfer will place food and beverage orders while playing the course. Today, beverage carts typically roam the fairway and sell refreshments to golfers. One embodiment of the system will allow golfers to summon the beverage cart anywhere on the course (prior art includes fixed systems where telephones are installed at various points around the course and golfers are able to call in orders to the clubhouse). Refreshments could be ordered in advance so they are available at the turn-around, further speeding play.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for providing golf play and management information to a golfer playing a golf course comprising:

(a) a first receiver constructed and arranged with the golfer to accept satellite signals from at least three sources, and to convert said satellite signals into first computer readable signals, wherein said first computer readable signals provides information for determining locations, (b) a second receiver constructed and arranged with the golfer to accept, at least, a correction signal, and to convert said correction signal into second computer readable signals, wherein said second computer readable signal provides information for correcting location information (c) computer means that accepts the first and second computer readable signals, said computer means pre-loaded with information relevant to playing the golf course, (d) means to send the first and second computer readable signals to said computer means, where the computer means determines corrected relative locations on the golf course, (e) display means in communications with said computer to report the corrected relative locations to the golfer, and (d) a base station and communication means for sending the location of the golfer to the base station, and wherein the second receiver also receives information on the locations of other golfing groups to prevent hitting into the groups and where the locations of the groups are displayed on said display means.

2. Apparatus as defined in claim 1 wherein the pre-loaded relevant information includes the location and shape of all features in play on the course - tees, fairways, rough, contours, trees, bodies of water, sand traps, greens, clubhouse, parking lots, the pin on the green, all the hazards and out-of-bounds in play, the relative vertical heights, the distance to the doglegs, wherein the computer via the display means communicates the distance of the cart to all said features.

3. Apparatus as defined in claim 2 wherein the display means comprises video means to display suggestions on playing from a particular location.

4. Apparatus as defined in claim 1 wherein the satellite system includes the Global Positioning System using the Navigational Satellite Timing and Ranging where the satellite signals include clock information, where the computer means includes an internal clock, and where the computer means compares the received clock information to the internal clock to determine the position of the golfer.

5. Apparatus for providing golf play and management information to a golfer playing a golf course comprising:

(a) a base station of known location, (b) at least two receivers constructed and arranged at the base station to accept satellite signals from at least three sources, and to convert said satellite signals into first computer readable signals, wherein said first computer readable signals provides redundant information for determining locations, (c) computer means constructed at said base station that accepts the first computer readable signals, calculates the location of the base station, compares the base station known location to the calculated location and therefrom generates correction information, (d) means for transmitting, constructed at the base station, to send, at least, the correction information, (e) a cart, (f) a cart receiver constructed and arranged on the cart to accept satellite signals from at least three sources, and to convert said satellite signals into second computer readable signals, (g) cart computer means that accepts the second computer readable signals and generates therefrom location information of the cart, (h) a second receiver constructed and arranged on the cart to accept, at least, the correction information and to correct the location information of the cart, (e) graphical display means in communication with one of the computer means, said display constructed on the cart to accept, display and report, at least, the corrected cart location information, and (d) communication means for sending the location of the golfer to said base station, and wherein said second receiver also receives information on the locations of other golfing groups to prevent hitting into the groups and where the locations of the groups are displayed on said display means.

6. Apparatus as defined in claim 5 wherein said cart is a golf ranger cart wherein the display shows all golfers playing on the course and means for the ranger cart to communicate with the other carts on the course such that a ranger can manage said golfers.

* * * * *